June 6, 1961 W. ORDINETZ ET AL 2,986,835
FISHING ROD BITE SIGNALLING LIGHT
Filed July 22, 1959
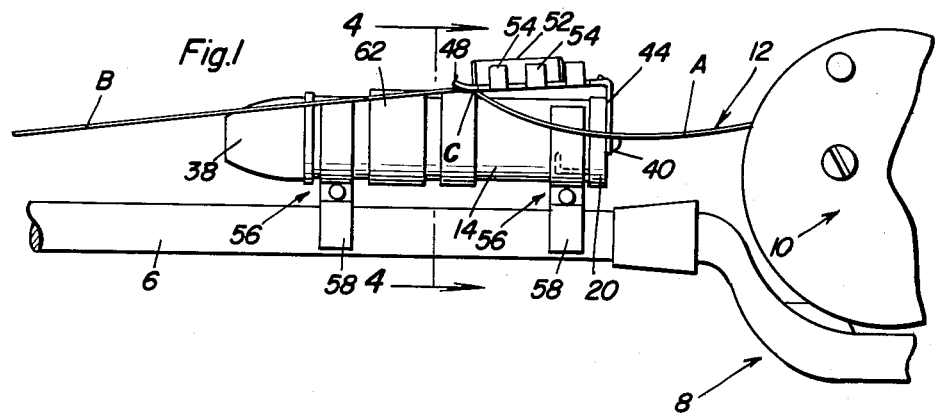
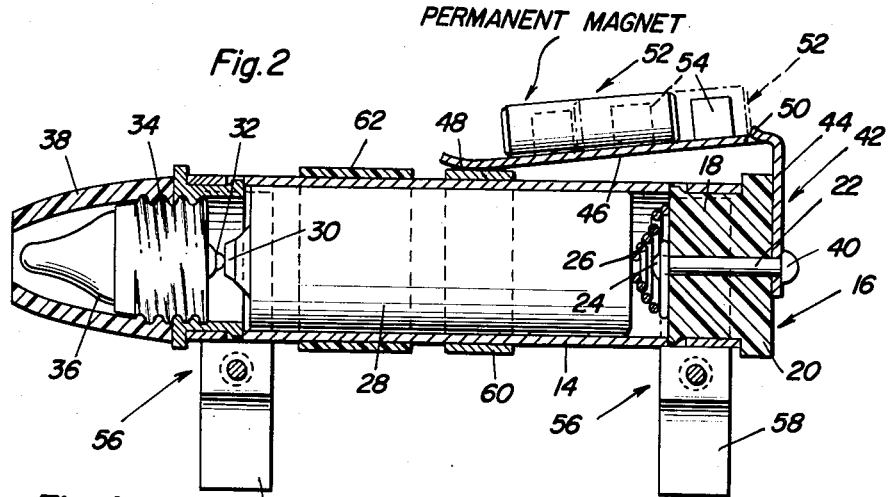
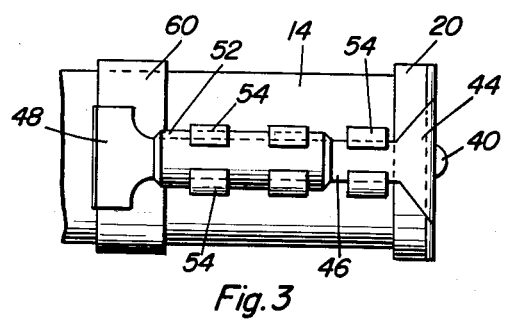
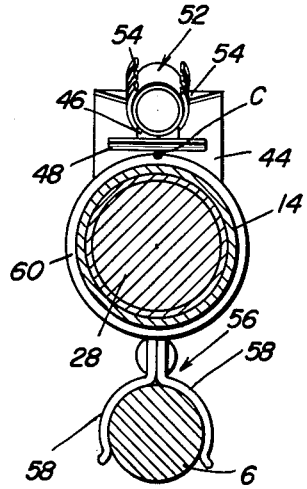
Walter Ordinetz
Wallace G. Clark, Sr. INVENTORS
BY Clarence A. O'Brien
and Harvey B. Jacobson
Attorneys United States Patent Office 2,986,835
Patented June 6, 1961

2,986,835
FISHING ROD BITE SIGNALLING LIGHT
Walter Ordinetz, 58 Merrill St., and Wallace G. Clark, Sr., R.F.D. 1, Box 341, both of Springfield, Vt.
Filed July 22, 1959, Ser. No. 828,756
5 Claims. (Cl. 43—17)

The present invention relates to a fish bite signalling device and has reference, more in particular, to a device which is such in construction that it may be readily attached to and mounted on a fishing rod and which is preferably, but not necessarily, usable for better night fishing results.

As is evident from the preceding general explanation the invention pertains to an attachment for a conventional-type fishing rod, said attachment employing a specially prepared and constructed flashlight and utilizing the available source of light as a visual signal, the light being normally off but coming on automatically when a fish has made a strike or nibbled at the baited hook.

In carrying out the preferred embodiment of the invention a comparatively simple L-shaped spring metal, or equivalent, clip is attached to one end of the battery case and has electrical connection with the battery in the case, the long portion of said clip constituting a line clamping and releasing finger and also serving as a circuit make and break element.

The invention features sliding ring-like collars which embrace the battery case. One collar is metal and provides a shiftable circuit make and break element or contact. The other collar is of insulation material, is independent of the first named collar and it can be manually shoved into a position between the circuit make and break finger and the case to temporarily place the circuit make and break means out of operation.

The invention also features a circuit make and break finger which has a plurality of suitably constructed members for seating and cradling a shiftably located permanent magnet, said magnet being adjustable so that it is possible to regulate the sensitivity and responsiveness of the circuit make and break finger relative to the current conducting and circuit closing collar.

Other objects, features and advantages will become more readily apparent from the following description and the accompanying illustrative, but not restrictive drawing.

In the drawing:

FIG. 1 is a side elevational view showing a fragmentary portion of a reel-equipped fishing rod and further showing the improved illuminable bite signal or signalling device and the manner in which it is constructed and effectually utilized.

FIG. 2 is a view on an enlarged scale showing the signalling device removed from the fishing rod.

FIG. 3 is a top plan view detailing the circuit make and break finger and the manually regulatable slidably mounted permanent magnet.

FIG. 4 is a section on an enlarged scale taken on the vertical line 4—4 of FIG. 1, looking in the direction of the arrows.

In FIG. 1 the fishing rod 6 is shown with a reel seat 8 for a suitable reel 10 carrying a fishing line 12.

The bite signalling device comprises a flashlight and means for attaching or mounting the same on the fishing rod in such a way that it does not interfere with the regular mode of use of the fishing rod. The elongated case or casing, usually a metal tube, is denoted by the numeral 14. There is a closure 16 plugged into the right-hand end portion, the plug portion thereof being denoted at 18 and a flange or head at 20. A metal rivet 22 is passed through a bore in the plug and one end is peened in place as at 24 and serves to properly mount a current conducting coil spring 26. The spring is shown contacting one end of the dry cell battery 28. The contact 30 on the other hand of the battery cooperates with a companion contact 32 on the screw-threaded base 34 of the bulb or lamp 36. The lamp is screwed in place and is of any appropriate construction and is housed within a protective shell or shade 38.

Reverting to the aforementioned rivet 22 the outer or rear end as seen at the right in FIG. 2 is suitably headed or peened as at 40 where it serves to connect the aforementioned L-shaped clip 42 to the battery case. More specifically the short arm or limb 44 parallels and rests against the head 20 and is secured to the rivet. The long arm or finger is inclined or pitched toward and is arranged exteriorly in a longitudinal direction on the metal battery case. This arm is denoted at 46. The free end thereof is slightly widened to provide a curvate movable contact or circuit make and break element 48. The struck-out tongue 50 is merely a shoulder or stop for one end portion of a readily applicable and removable as well as adjustable permanent magnet. This magnet is denoted at 52 and it is removably and slidingly held atop the finger 46 by way of suitable springy grips or jaws 54 carried by the opposite longitudinal edges of said finger. The magnet is manually shiftable from the full line to the dotted line position and vice versa as is apparent in FIG. 2.

The unit or signalling device is mounted by appropriate brackets 56 on the fishing rod. The brackets have appropriate yieldable grips 58 which snap over the fishing rod and thus attach the device to the rod.

At this time attention is directed to a circuit make and break current conducting collar or ring 60 which embraces the metal case 14 and may be slid along the casing either to the right or left in relation to the given position seen in FIG. 2. There is also a somewhat wider ring-like collar or sleeve made of insulation material and this is denoted at 62. When the signalling means is out of use one may shift or slide the ring 60 to the right in FIG. 2 and take it out of play. At the same time the ring or collar 62 of insulation material may replace the ring 60, as it were, and thus render the "switch" or circuit make and break means temporarily inactive. It was thought unnecessary to show these various shiftable positions of the collars 60 and 62 because it is a phase of the matter which is clearly self-evident from the drawing.

Although it would be within the purview of the invention perhaps to dispense with the collar or ring 60 and to allow the circuit make and break portion 48 of the finger to snap directly against the metal case the arrangement shown is preferred because one soon learns to replace the ring 60 which is out of play with the ring of insulation 62 thus making for a more systematic mode of using the invention.

Moving the magnet 52 up or down the circuit breaking finger 46 either increases or decreases the magnetic attraction forces of the finger relative to the steel band or collar 60 which in turn increases or decreases the gripping pressure of the components 60 and 48 on the fishing line. In FIG. 1 the portion of the line adjacent to the reel is denoted at A, the portion of the line forwardly of the signalling device is denoted at B and the portion which is releasably gripped is denoted at C. By simply inserting the portion C between the clamping surfaces of the collar 60 and the circuit make and break or trip 48 the circuit is open. When the part B of the line is taken by the fish and sufficient pull is exerted it is obvious that the portion C is yanked out from its clamped position and this allows the circuit make or break contact element 48 to contact the collar 60 and thus close the circuit in an obvious manner.

It might be within the purview of the invention to embody a certain amount of weight in the permanent magnet so that the weight factor might tend to vary the leverage of the springy finger 46. In addition to the pertinent information already given, it is desired to touch upon the additional features and advantages. That is, the invention has the least number of parts evidently utilized in a device of this kind, that is, compared to known prior art adaptations. It is small in size and weight and does not hinder the use of the fishing pole in its regular manner. The line is free of the fishing line bite signalling light and does not interfere with casting out the bait or retrieving the catch.

Also with this device the fisherman can put his pole or rod down leaving his hands free to do other things, knowing that the rod equipped with this novel signalling device will provide the signal at the time the strike at the bait is made.

The invention can be clipped on in either direction, that is, the light beam can be directed onto the handle and the reel which will guide the fisherman to his pole; or the light beam can be directed forwardly and out along the rod or pole to give the fisherman a visual account of the action when the action takes place.

Although a single dry cell or battery is shown, more than one cell can be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing line controlled bite signalling device comprising a flashlight embodying a metal case provided with a normally extinguished but illuminable lamp bulb, a dry cell in said case cooperating with said bulb, a closure at one end of the case having current conducting relation with an end portion of the dry cell, a clip having one end connected with said closure and the other end portion extending lengthwise of the exterior of the case, said clip being resilient and having a free end portion providing a contact element movable toward and from the case, separate selectively usable collars slidably surrounding the case, one collar being of metal and serving to conduct current and being adapted to be interposed between the contact element and case when a limited looped portion of the line is releasably positioned between the contact element and said one collar and then manually shoved from its position between the contact element and said case when the line actuated signalling light is not called for, and then replaced by the other collar, said other collar being of insulation material whereby when it is located in a position between the case and contact element, the contact element is rendered electrically inactive, said clip being inclined from said one end toward said case, a permanent magnet slidingly and removably mounted atop said clip and held thereon for operational use by retaining members provided for such purpose on longitudinal edges of the clip, said magnet having the additional function of a weight whereby to increase or decrease the responsive tension properties of the free end of the clip.

2. A bite signalling device responsive to a pull on a fishing line which is looped and cooperable with said device comprising a flashlight embodying a metal case provided with a lamp bulb, a dry cell battery mounted in said case and having operable association with said bulb, a closure at one end of the case having current conducting relation with an end portion of said battery, a clip having one end connected with said closure and the other end extending lengthwise of the exterior of said case, said clip being resilient and having a free end portion providing a contact element which is movable toward and from the case, separate selectively usable collars surrounding and slidably mounted on said case, one collar being of current conducting metal and being adapted to be selectively interposed between the contact element and case when said one collar is being used and also intentionally and manually shoved from its in-use position to an out-of-the-way position when it is not being used at which time it may be replaced by the other collar, said other collar being of insulation material whereby when it is located in its in-use position between the case and contact element, said contact element is rendered electrically inactive, a portion of the fishing line being adapted to be looped and releasably interposed between said one collar and contact element when the signalling device is set for use, said clip being provided with seating and retaining elements, and a manually shiftable permanent magnet resting accessibly atop said clip and held removably and adjustably in its intended place by said retaining members.

3. The structure defined in claim 2, and wherein said case is provided with brackets and said brackets are in turn provided with means whereby the brackets may be removably snapped on and held in an intended position on the fishing rod.

4. An illuminable fish bite signalling device responsive to a pull on a fishing line comprising means usable on a lamp-equipped battery containing metal case of a type employed, for example, in a flashlight, a closure having a plug, said plug being plugged into one end of the case, said plug being provided with a coil spring at one end and a centrally disposed rivet operatively connected to the coil spring and extending through the plug, an L-shaped metal clip having one end portion thereof abutting the plug and connected with said rivet, the other end portion being opposed to and cooperable with a side surface of the case and constituting and providing a circuit make and break finger, said finger being resilient and having a free end portion providing a contact element, and a metal ring-like circuit make and break collar slidingly encircling the case and adapted to be interposed between the contact element and case with a limited pull-actuated portion of fishing line releasably held between the contact element and coacting peripheral surface of the collar, said finger being provided with a readily applicable and removable slidably mounted permanent magnet, said magnet and said finger cooperating in selectively increasing or decreasing the magnetic attraction forces of the finger relative to the magnetizable case and collar, whereby to thus regulate and vary the line gripping action of said contact element.

5. An illuminable fish actuated line-controlled bite signalling device comprising, in combination, means usable on a lamp-equipped battery-containing case of a type employed in the construction of a flashlight, a closure having a plug plugged into and closing one end of the case, the inner end of said plug being pivoted with a coil spring and a current conducting fastener operatively connected to the coil spring and extending through the plug, an L-shaped metal clip having one portion thereof abutting the plug and connected with the fastener and the other end portion cooperating with said case and adapted to serve as a circuit make and break finger, said finger being resilient and having a free end portion providing a contact element and also constituting a fishing line gripping and retaining and releasing element when a portion of the line is manually looped and releasably engaged therewith, the inherent resiliency of said finger serving to urge said contact element toward the battery containing case in a manner to releasably retain said portion of the line in its desired pull responsive position, a first collar encircling said case and also adapted to be interposed between the contact element and case, said collar being made of insulation material whereby when it is in use it acts as a circuit opening spacer between the case and contact element, a second collar encircling said case and adapted to be substituted for the first collar and interposed between said contact element and case and being of current conducting material, said contact element and second collar and metal case functioning to close the circuit when said second collar is set for that particular purpose, said case being circular in cross-section and said collars being ring-like and snugly encircling the case but capable of being freely moved by hand into and out of their respective intended positions relative to the contact element, the major portion of said finger being spaced from the adjacent side of said case, and the existing space being of a length that, if desired, both collars may be moved to and stored in said space, said collars being removable from the plug-equipped end of the case when the plug and the attached L-shaped clip have been intentionally removed to facilitate applying and removing the collars.

References Cited in the file of this patent

UNITED STATES PATENTS

| | | |
|---|---|---|
| 2,627,690 | Kniffer | Feb. 10, 1953 |
| 2,741,055 | Weber | Apr. 10, 1956 |
| 2,790,263 | Chaney | Apr. 30, 1957 |